Patented Dec. 17, 1929

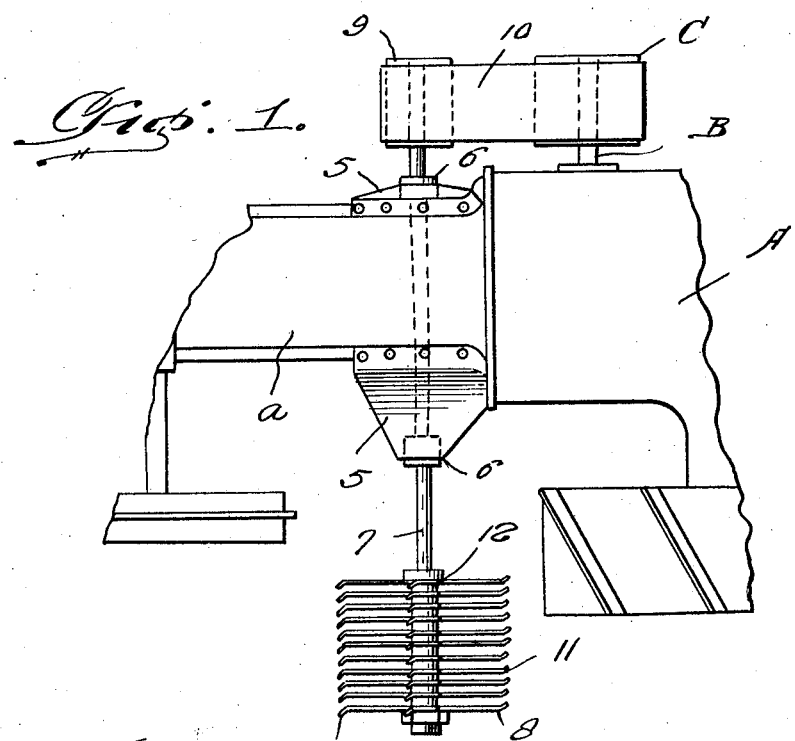
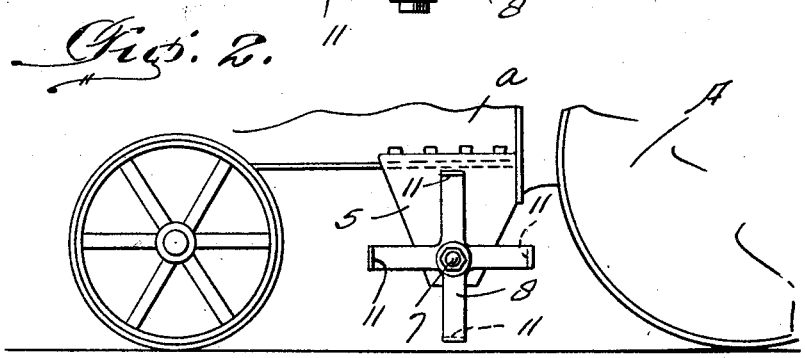
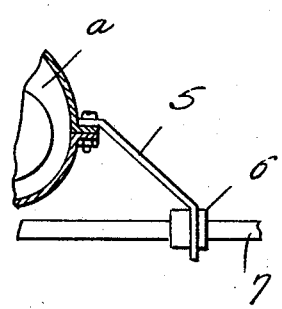

1,740,069

UNITED STATES PATENT OFFICE

GEORGE E. CHASE, OF DEFIANCE, OHIO

STUBBLE SHREDDER

Application filed June 3, 1927. Serial No. 196,284.

This invention relates to new and useful improvements in devices for shredding stubbles in order that a field may be properly plowed, the previously shredded stubble turning over into the furrow to effect a fertilizer.

In carrying out my invention there is provided a highly novel and efficiently operating device that may be readily associated with tractors of conventional construction and operated by the movement of the tractor over the ground, and this if desired during the plowing operation, the shredding mechanism per se being at the side of the tractor and preceding the plowing mechanism.

An important advantage of the present invention is to provide a stubble shredding device that may be readily applied to tractors without requiring any modification of the tractor structure and without to any extent whatever interfering with the usual operation of the tractor.

In the drawing wherein like reference characters indicate corresponding parts throughout the several views:

Figure 1 is a fragmentary top plan of a conventional tractor equipped with my stubble shredder.

Figure 2 is a fragmentary side elevation more clearly disclosing the shape of the various cutter blades, and Figure 3 is a fragmentary transverse section through the center of the tractor for disclosing the manner of supporting the power shaft of the device beneath the tractor transmission housing.

Now having particular reference to the drawing, A designates generally a conventional design of tractor equipped at its side with the usual power take off shaft B upon which is arranged a belt pulley C. In carrying out my invention there is rigidly bolted to the usual longitudinal flanges at opposite sides of the tractor transmission housing $a$, a pair of outwardly and downwardly extending metallic plates 5—5, the lower ends of which are bent directly downwardly and equipped with transversely aligned shaft bearings 6—6. Arranged transversely beneath the transmission housing $a$, and within said alined bearings 6—6 is an elongated shaft 7, one end of which is equipped with a plurality of spaced shredding blades 8, while the oposite end thereof adjacent the pulley C of the tractor A is equipped with a belt pulley 9. Trained over the pulleys 9 and C is an endless power belt 10.

These cutting blades 8 are of the right angular cross blade design as clearly indicated in Figure 2, the ends of the blades being formed at opposite edges with diagonally bent cutting tongues 11, certain ones of which are turned inwardly, while the remaining ones are turned outwardly as indicated in Figure 1. These blades are arranged centrally upon the end of the shaft 7 and are maintained in spaced relation by collars 12. Furthermore, the disposition of the shaft 7 as well as the size of the blade will cause the cutting operation on the stubble to be performed closely to the earth surface so that practically the entire length of the protruding stubble will be shredded, after which the shreds will fall over upon the roots and when the ground is plowed, will afford a fertilizing agency.

It will thus be seen that I have provided a highly novel, simple and efficiently operating stubble shredder that may be conveniently associated with tractors of conventional design, and even though I have herein shown and described the invention as consisting of certain detail structural elements it is nevertheless to be understood that certain changes may be made therein without affecting the spirit and scope of the appended claim.

Having thus described the invention, what I claim as new is:—

A rotary shredder for standing stalks comprising a shaft adapted to be rotatably mounted on a vehicle, a plurality of cutter members arranged in spaced relation on said shaft, said cutters being each constructed of a single sheet of material formed to provide a plurality of radiating blades, and laterally disposed cutting tongues, on the ends of said blades, certain of these tongues on each cutter are disposed obliquely beyond one side of the cutter, while the remaining tongues are disposed likewise beyond the opposite side of the blade.

In testimony whereof I affix my signature.

GEORGE E. CHASE.